United States Patent [19]

Wittmann et al.

[11] Patent Number: 4,937,285

[45] Date of Patent: Jun. 26, 1990

[54] USE OF REDOX GRAFT POLYMERS TO IMPROVE THE PETROLEUM-RESISTANCE OF THERMOPLASTIC, AROMATIC POLYCARBONATE AND/OR POLYESTER CARBONATE MOULDING COMPOSITIONS

[75] Inventors: Dieter Wittmann; Jochen Schoeps, both of Krefeld; Christian Lindner, Cologne, all of Fed. Rep. of Germany; Hans-Jürgen Kress, Pittsburgh, Pa.

[73] Assignee: Bayer Aktiengesellschaft, Leverkusen, Fed. Rep. of Germany

[21] Appl. No.: 266,785

[22] Filed: Nov. 3, 1988

[30] Foreign Application Priority Data

Nov. 10, 1987 [DE] Fed. Rep. of Germany ....... 3738143

[51] Int. Cl.$^5$ .............................................. C08L 69/00
[52] U.S. Cl. .......................................... 525/67; 525/64
[58] Field of Search ........................... 525/67, 146, 148

[56] References Cited

U.S. PATENT DOCUMENTS

| | | | |
|---|---|---|---|
| 3,118,854 | 1/1964 | Hess et al. ........................... | 260/45.5 |
| 3,288,887 | 11/1966 | Yoshino et al. ...................... | 260/880 |
| 3,651,177 | 3/1972 | Saito et al. ........................ | 260/876 R |
| 3,657,391 | 4/1972 | Curfman ........................... | 260/876 R |
| 3,670,052 | 6/1972 | Saito et al. ........................ | 260/876 R |
| 3,775,514 | 11/1973 | Amagi .............................. | 260/876 R |
| 3,880,786 | 4/1975 | Feast et al. ..................... | 260/23 EM |
| 3,959,895 | 6/1976 | Lonning ............................ | 260/29.7 |
| 4,351,923 | 9/1982 | Tokas ................................ | 525/250 |
| 4,567,234 | 1/1986 | Meunier ............................. | 525/73 |

FOREIGN PATENT DOCUMENTS 3708913 9/1988 Fed. Rep. of Germany .

*Primary Examiner*—John C. Bleutge
*Assistant Examiner*—David Buttner
*Attorney, Agent, or Firm*—Connolly and Hutz

[57] ABSTRACT

The present invention relates to the use of specific graft polymers to improve the petroleum-resistance of thermoplastic, aromatic polycarbonates and/or polyester carbonates, mixtures of polycarbonate and/or polyester carbonate with these specific graft polymers and, if appropriate, with other thermoplastic resins and/or with effective amounts of customary additives, and in addition to a process for the production of these mixtures.

11 Claims, No Drawings

USE OF REDOX GRAFT POLYMERS TO IMPROVE THE PETROLEUM-RESISTANCE OF THERMOPLASTIC, AROMATIC POLYCARBONATE AND/OR POLYESTER CARBONATE MOULDING COMPOSITIONS

German Patent Application No. P 3,708,913.7 (Le A 25 099) describes the preparation of graft polymers from (a) 40 to 90% by weight of an at least partially cross-linked, particulate diene rubber of average particle diameter 0.1 to 0.6 $\mu$m, and (b) 60 to 10% by weight of styrene, acrylonitrile, methyl methacrylate or mixtures thereof, by emulsion graft polymerization,
which is characterized in that, for the graft polymerization, an initiator system comprising an organic hydroperoxide and ascorbic acid is used and a graft yield of >60% by weight is achieved.

Graft polymers of resin-forming monomers on rubber are known and have proven successful for the production of mouldings made from synthetic materials. In the preparation of such graft polymers by free-radical polymerization, free polymers of the resin-forming monomers form as byproducts. The ratios are described quantitatively by means of the degree of grafting, i.e. by means of the weight ratio between the graft-polymerized monomers and the (rubber) graft base. In graft polymers having rubber contents of 40% by weight, the maximum degree of grafting is thus 1.5; in contrast, it is 0.1 in those containing 90% by weight of rubber if the resin-formed monomers are fully grafted onto the rubber. The degree of grafting depends on the rubber content and is therefore particularly suitable for comparing graft polymers of equal rubber content. Usually, the degree of grafting is less than the maximum possible, for example in the region of about 0.7 for rubber contents of 40% by weight, and in the region of about 0.05 in the case of rubber contents of 90% by weight, i.e. only part of the resin formed during the graft polymerization is actually grafted onto the rubber. In order to characterize highly grafted rubbers (or in order to describe the extent of a graft polymerization), the graft yield, i.e. the weight ratio between the grafted monomer and the total resin monomer (the value is multiplied by 100 and specified in %), is more suitable.

In the case of complete grafting, the graft yield is 100%. The customary graft yields for graft polymers having rubber contents from 40% to 90% by weight are about 40% to 60%, high graft yields generally only occurring in the case of graft polymers having a high rubber content (greater than 60%). However, graft polymers having the highest possible graft yield (containing the lowest possible amounts of free polymer of the resin-forming monomers) are necessary for a number of applications since the polymer which is not bound to the rubber influences the physical properties (in particular in mixtures with further components). Thus, in the absence (or reduction in the amount) of the free polymers, the graft polymers loose their pure thermoplastic character and become more similar to elastomers, until they have the appearance of rubbers which can be processed thermoplastically.

According to German Patent Application No. P 3,708,913.7 (Le A 25 099), it has now been found that graft polymers of resin-forming monomers on rubbers—also called resin/rubber graft polymers below—can be produced in high graft yields (so that they contain surprisingly small amounts of free polymers) if the graft polymerization is carried out in emulsion using an initiator system comprising an organic hydroperoxide and ascorbic acid.

The graft polymers obtained are suitable as thermoplastic moulding compositions or as components of such compositions, for example in combination with styrene-acrylonitrile copolymers, $\alpha$-methylstyrene-acrylonitrile copolymers, PVC or other ABS graft polymers.

According to a preferred embodiment, the graft polymerization of the monomers (b) is carried out in aqueous emulsion in the presence of an emulsion of the rubber polymer (a) at temperatures of 40° to 70° C., in particular 50° to 70° C., using an initiator system comprising an organic hydroperoxide (I) and ascorbic acid (II), 0.3 to 1.5 parts by weight of (I) and 0.1 to 1 part by weight of (II), in each case relative to 100 parts by weight of graft monomers, being employed and the (I):(II) weight ratio being 0.3 to 15, in particular 1 to 10, preferably 3 to 8. [See page 4, paragraph 2, of German Patent Application No. P 3,708,913.7 (Le A 25 099)].

According to German Patent Application No. P 3,708,913.7 (Le A 25 099), the graft polymers are polymers which are obtained by polymerization of resin-forming monomers in the presence of a diene rubber, the polymer of the resin-forming monomers being graft-polymerized as completely as possible.

The diene rubbers of German Patent Application No. P 3,708,913.7 (Le A 25 099) are preferably homopolymers of butadiene, isoprene and chloroprene and copolymers of these monomers containing up to 40% by weight of other monomers, such as acrylonitrile, styrene, alkyl acrylate, and alkyl methacrylate, and also, if appropriate, small amounts of a polyfunctional vinyl monomer, such as divinylbenzene and diol bisacrylates.

The rubbers are at least partially crosslinked and have gel contents of 10 to 90% by weight, in particular 40 to 80% by weight, and are particulate, having average particle sizes ($d_{50}$ values) of 0.1 to 0.6 $\mu$m, in particular 0.1 to 0.5 $\mu$m. Particulate rubbers of this type are known. They are produced by emulsion polymerization and usually exist as lattices.

According to German Patent Application No. P 3,708,913.7 (Le A 25 099), the graft polymers can be prepared in aqueous emulsion by polymerization of the monomers onto a rubber present in aqueous emulsion. In this procedure, surface-active auxiliaries, emulsifiers or dispersants and also, if appropriate, additives, are usually employed in order to produce certain pH values and electrolyte contents during the graft polymerization. Under certain circumstances, the emulsion graft polymerization can also be carried out without addition of emulsifier, in particular when using small amounts of monomer relative to the amount of rubber, or when the amounts of emulsifier present in the rubber emulsion (latex) itself are already sufficient to ensure graft polymerization of the monomers in the emulsion state with adequate emulsion stability.

Anionic emulsifiers, preferably alkali metal salts of fatty acids, resin acids, disproportionated resin acids, alkylsulphonic acids and arylsulphonic acids, are particularly suitable. They are employed in amounts up to 5% by weight, preferably up to 2.5% by weight, relative to the monomers to be polymerized.

Suitable hydroperoxides are, for example, cumene hydroperoxide, tert.-butyl hydroperoxide and hydrogen peroxide, preferably cumene hydroperoxide and tert.-butyl hydroperoxide, i.e. hydroperoxides of long half-value periods.

According to German Patent Application No. P 3,708,913.7 (Le A 25 099), the process can be carried out, for example, as follows:

An aqueous emulsion of a partially crosslinked diene rubber is grafted batchwise or continuously in aqueous emulsion; the graft monomers and, where appropriate, additional emulsifier and hydroperoxide, and also ascorbic acid solutions, are added to the rubber emulsion at polymerization temperatures of 40° to 70° C., in particular 50° to 70° C. During this procedure, the amount ratios described above should be observed. In exceptional cases, catalytically small amounts of heavy-metal cations, in particular Fe, can be introduced into the polymerization as further components of the initiator system, in particular when it is necessary to use diene rubber emulsions which themselves already contain relatively large amounts of complexing agents. The process is normally carried out without addition of iron ions; this method is preferred and permits graft polymers which are virtually free of or are low in heavy metals to be obtained in an industrially advantageous manner, since, as is known, metal traces of this type can have a disadvantageous effect on the applicational properties of plastics. The process operates using an aqueous solution of ascorbic acid and aqueous solutions of the hydroperoxide; it is advantageous to feed hydroperoxides which are not sufficiently water soluble, such as cumene hydroperoxide, into the polymerization system in the form of an aqueous emulsion. The same emulsifier as in the graft polymerization is advantageously employed in such emulsions.

The hydroperoxide and the ascorbic acid may be metered into the graft polymerization in portions or continuously. In a preferred variant, proportionate amounts of the hydroperoxide are initially introduced into the reactor together with the rubber to be grafted; the graft monomers and the remaining ascorbic acid, hydroperoxide and, where appropriate, emulsifier are fed separately into the reactor as the polymerization of the graft monomers proceeds.

The amounts of hydroperoxide and ascorbic acid are crucial. If an excessive amount of hydroperoxide and/or ascorbic acid is introduced, the graft polymerization is impaired. The graft yield drops; the molecular weight of the grafted and the free resin becomes lower; in addition, excess or deficient amounts of hydroperoxide and ascorbic acid can have a very sensitive effect on monomer conversion and emulsion stability, so the graft polymerization cannot be achieved industrially. In order to optimize the execution of the process, the structure of the graft polymers and their physical properties, it is absolutely necessary to observe a temperature of 40° to 70° C. and the abovementioned amounts of hydroperoxide and ascorbic acid during the graft polymerization.

During the graft polymerization up to monomer conversions of greater than 90% by weight, in particular greater than 98% by weight, graft polymer emulsions are produced which have polymer contents of 25 to 50% by weight and are stable on storage; the graft polymer itself can readily be isolated from the emulsions by known coagulation methods (for example using acids or salts). If it is desired to combine the graft polymers with thermoplastic resins which themselves exist as emulsions, the graft polymer emulsion can be mixed with the resin emulsion and coagulated together.

The graft polymers of German Patent Application No. P 3,708,913.7 (Le A 25 099) are distinguished by particular thermoplastic-elastic properties, which are apparent, for example, in the stress-strain behaviour and the modulus of elasticity; they can therefore advantageously be used if a rubber-like behaviour in combination with a certain rigidity is required, i.e. for the production of rubber articles which must not be vulcanized. On the other hand, they are valuable components for thermoplastic moulding compositions, for example for the production of mouldings of high notched impact strength and exceptional property combinations, for example heat distortion resistance and notched impact strength, or modulus behaviour and notched impact strength. They are suitable, in particular, for mixing with PVC; the resultant moulding compositions can be processed into mouldings by extrusion or injection moulding, in particular into pipes, sheets, large containers or thermoformed films.

Surprisingly, it has now been found that graft polymers of this type, which can be produced in accordance with German Patent Application No. P 3,708,913.7 (Le A 25 099), improve the petroleum-resistance of thermoplastic, aromatic polycarbonate and/or polyester carbonate moulding compositions. This effect also applies when the moulding compositions according to the invention contain, as further thermoplastic components, vinyl copolymers (C1) or polyalkylene terephthalates (C2).

The present invention thus relates to the use of graft polymers, prepared from
(a) 40 to 90% by weight of an at least partially crosslinked, particulate diene rubber of average particle diameter 0.05 μm to 2.0 μm, preferably 0.1 μm to 0.6 μm, and
(b) 60 to 10% by weight of styrene, acrylonitrile or methyl methacrylate, or mixtures thereof, by emulsion graft polymerization, an initiator system comprising an organic hydroperoxide and ascorbic acid being used for the graft polymerization and a graft yield of >60% by weight, preferably >75% by weight, in particular >85% by weight, relative to the monomers (b) employed, being achieved, for improving the petroleum-resistance of thermoplastic, aromatic polycarbonate and/or polyester carbonate moulding compositions, which may, if appropriate, contain, as further thermoplastic components, vinyl copolymers (C1) or polyalkylene terephthalates (C2).

According to a preferred embodiment, graft polymers of German Patent Application No. P 3,708,913.7 (Le A 25 099) are used which are prepared by graft polymerization of the monomers (b) in aqueous emulsion in the presence of an emulsion of the rubber polymer a) at temperatures of 40° C. to 70° C., in particular 50° C. to 70° C., 0.3 to 1.5 parts by weight of hydroperoxide (I) and 0.1 to 1 part by weight of ascorbic acid (II), in each case relative to 100 parts by weight of graft monomers (b), being employed and the (I):(II) weight ratio being 0.3 to 15, in particular 1 to 10, and preferably 3 to 8.

The graft polymers based on polybutadiene, having particle sizes outside the range specified in German Patent Application No. P 3,708,913.7 and which can be used according to the invention are prepared in a manner analogous to the preparation of No. P 3,708,913.7.

Thermoplastic, aromatic polycarbonate and/or polyester carbonate moulding compositions are taken to mean, on the one hand, aromatic polycarbonates and, on the other hand, mixed polyphenol esters of aromatic dicarboxylic acids and of carbonic acid, the former being preferred.

It is known to improve the toughness of polycarbonates, in particular at low temperatures, by adding graft polymers based on polybutadiene (see, for example, DE-AS No. 1,170,141 or U.S. Pat. No. 3,130,177).

Modifiers based on polyacrylates, polyolefins, rubber-like diene polymers or styrene polymers, or mixtures thereof, have the same sort of action in copolyester carbonates (see, for example, EP-OS No. 0,119,311).

However, a disadvantage of such moulding compositions is the inadequate resistance against fuels (petroleum) or other organic solvents.

In order to provide resistance against petroleum and good notched impact strength of polycarbonate moulding compositions, specific block copolymers (Kraton ® G) and either copolymers made from olefins and acrylates (see European Patent No. 0,119,533) or with graft copolymers (see EP-OS No. 0,173,358) are employed.

For mixtures of copolyester carbonates with polycarbonates, a combination of the specific block copolymer mentioned with an olefin-acrylate copolymer or an olefin-diene terpolymer is likewise used (see EP-OS No. 0,186,825). However, the addition of the specific block copolymers may lead to impairment in the quality of the moulding composition, such as delamination and poorer low-temperature toughness.

From the EP-OS No. 0 104 696 mixtures or graft polymers with polycarbonates, with polyurethanes and optionally with copolymers are known, having a good petrol resistance and very good processing characteristics. For the preparation of the polymerisation redox initiator systems may be used.

Another way of preparing polycarbonate moulding compositions of good impact strength and surface resistance against petroleum and other fuels is to combine polycarbonates with polyalkylene terephthalates to which specific polymers are added [see DE-OS No. 3,302,124 (Le A 22 051), in particular page 27, paragraph 3, and EP-OS No. 0,131,196 (Le A 22 440), page 12, final paragraph], the petroleum resistance being improved, even without addition of polyester, by adding nitrile rubbers to polycarbonates in accordance with EP-OS No. 0,131,196 (see grant proceedings of European Patent No. 0,131,196).

The graft polymers to be employed according to the invention improve the resistance of polycarbonate/polyalkylene terephthalate moulding compositions beyond the level known from DE-OS No. 3,302,124. With polycarbonate, the graft polymers according to the invention produce petroleum-resistant moulding compositions which are tough at low temperatures without any further additive as is necessary according to European Patent No. 0,131,196.

Corresponding mixtures in which the polycarbonate component is a polydiorganosiloxane-polycarbonate block copolymer are known from DE-OS No. 3,347,071 and DE-OS No. 3,506,680.

According to the present invention, thermoplastic, aromatic polycarbonate and/or polyester carbonate moulding compositions are successfully rendered petroleum-resistant by means of graft polymers, and the good properties of the mixtures comprising thermoplastic, arommatic polycarbonates and/or polyester carbonates and thermoplastic graft polymers are obtained at the same time.

The polycarbonates and/or polyester carbonates in question here are known from the literature or can be prepared by processes which are known from the literature (in this respect, see, for example, Schnell, "Chemistry and Physics of Polycarbonates", Interscience Publishers, 1964, DE-AS No. 1,495,626, DE-OS No. 2,232,877, DE-OS No. 2,703,376, DE-OS No. 3,000,610, DE-OS No. 2,714,544, DE-OS No. 2,940,024 and DE-OS No. 3,007,934). The phase interface process is particularly preferred.

Polycarbonates and/or polyester carbonates are prepared in a known fashion, for example by reacting diphenols with carbonic acid halides, preferably phosgene, and/or with aromatic dicarbonyl dihalides, preferably benzenedicarbonyl dihalides, by the phase interface process, if appropriate using chain terminators, for example monophenols, and if appropriate also using trifunctional or polyfunctional branching agents, for example triphenols or tetraphenols. [For the preparation of aromatic polycarbonates, see, for example, Schnell, loc. cit., pages 31 ff; for the preparation of aromatic polyesters, see, for example, DE-OS No. 2,940,024 (Le A 19 932) and for the preparation of aromatic polyester carbonates, see, for example, DE-OS No. 3,007,934 (Le A 20 203)].

Diphenols for the preparation of the polycarbonates and/or polyester carbonates are preferably those of the formula (I)

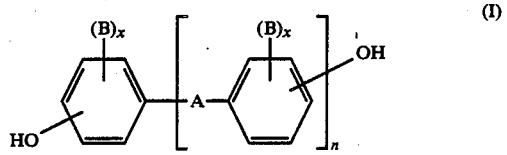

in which

"A" is a single bond, a $C_1$–$C_5$-alkylene, a $C_2$–$C_5$-alkylidene, a $C_5$–$C_6$-cycloalkylidene, —O—, —SO—,

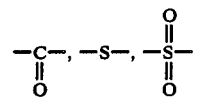

or a radical of the formula (II)

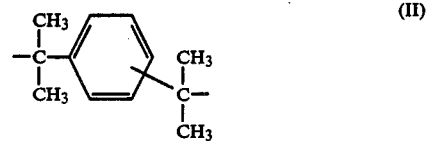

"B" is chlorine, bromine or methyl,

"X" is 0, 1 or 2, and "n" is 1 or 0.

Preferred diphenols are thus hydroquinone, resorcinol, dihydroxydiphenyls, bis-(hydroxyphenyl)-$C_1$–$C_5$-alkanes, bis-(hydroxyphenyl)-$C_5$–$C_6$-cycloalkanes, bis-(hydroxyphenyl) ethers, bis-(hydroxyphenyl) sulphoxides, bis-(hydroxyphenyl) ketones, bis-(hydroxyphenyl) sulphides, bis-(hydroxyphenyl) sulphones and $\alpha,\alpha$-bis-(hydroxyphenyl)-diisopropylbenzenes, and the ring-brominated and/or ring-chlorinated and/or ring-methylated derivatives thereof.

The most important diphenols are bisphenol A, 2,2-bis-(3,5-dimethyl-4-hydroxyphenyl)-propane, 2,4-bis-(4- hydroxyphenyl)-2-methylbutane, 1,1-bis-(4-hydroxyphenyl)-cyclohexane, 4,4-dihydroxyphenyl sulphide, 4,4-dihydroxyphenyl sulphone, and the di- and tetrabrominated or -chlorinated derivatives thereof, such as 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

2,2-(bis-4-Hydroxyphenyl)-propane (bisphenol A) is particularly preferred.

The diphenols can be employed individually or as any desired mixtures.

The diphenols are known from the literature or can be obtained by processes which are known from the literature.

Suitable chain terminators for the preparation of the thermoplastic, aromatic polycarbonates are, for example, phenol, p-chlorophenol, p-tert.-butylphenol or 2,4,6-tribromophenol, but also long-chain alkylphenols, such as 4-(1,3-tetramethylbutyl)-phenol according to DE-OS No. 2,842,005 (Le A 19 006) or monoalkylphenol or dialkylphenols having a total of 8 to 20 C atoms in the alkyl substituents, such as 3,5-di-tert.-butylphenol, p-iso-octylphenol, p-tert.-octylphenol, p-dodecylphenol and 2-(3,5-dimethylheptyl)-phenol and 4-(3,5-dimethylheptyl)-phenol. The amount of chain terminators to be employed is generally between 0.5 mol-% and 10 mol-%, relative to the total number of moles of the diphenols employed in each case.

The thermoplastic, aromatic polycarbonates have average weight-average molecular weights (Mw, measured, for example, by ultracentrifugation or scattered-light measurement) of 10,000 to 200,000, preferably 20,000 to 80,000.

The thermoplastic, aromatic polycarbonates may be branched in a known manner, preferably by introduction of 0.05 to 2.0 mol-%, relative to the sum of the diphenols employed, of trifunctional or polyfunctional compounds, for example those having three or more than three phenolic groups.

Both homopolycarbonates and copolycarbonates are suitable. For the preparation of copolycarbonates A) according to the invention, it is alternatively possible to employ 1% to 25% by weight, preferably 2.5% to 25% by weight (relative to the total amount of diphenols to be employed), of diphenols of the formula (III)

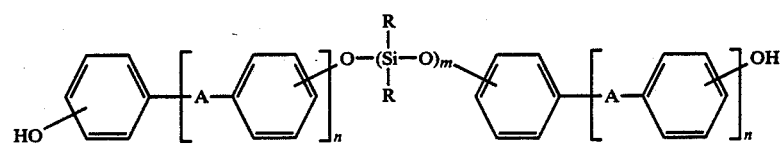

(III)

in which
—A— has the meaning mentioned for the formula (I), n is 1 or zero, the R are identical or different and are a linear $C_1$-$C_{20}$-alkyl, branched $C_3$-$C_{20}$-alkyl or $C_6$-$C_{20}$-aryl, preferably $CH_3$, and m is an integer between 5 and 100, preferably between 20 and 80. Polydiorganosiloxanes containing hydroxy-aryloxy terminal groups of the formula (III) are known (see, for example, U.S. Pat. No. 3,419,634) or can be prepared by processes which are known from the literature. The preparation of polydiorganosiloxane-containing copolycarbonates is described, for example, in DE-OS No. 3,334,782.

Besides biphenol A homopolycarbonates, preferred polycarbonates are the copolycarbonates of bisphenol A containing up to 15 mol-%, relative to the total number of moles of diphenols, of others of the most important diphenols, in particular of 2,2-bis-(3,5-dibromo-4-hydroxyphenyl)-propane.

Aromatic dicarbonyl dihalides for the preparation of the thermoplastic, aromatic polyesters and thermoplastic, aromatic polyester carbonates are preferably the diacyl dichlorides of isophthalic acid, terephthalic acid, diphenyl ether 4,4'-dicarboxylic acid and naphthalene-2,6-dicarboxylic acid.

Mixtures of the diacyl dichlorides of isophthalic acid and terephthalic acid in the ratio between 1:20 and 20:1 are particularly preferred.

The dicarbonyl dihalides are the only bifunctional acid derivatives used for the preparation of the aromatic polyesters; in the preparation of polyester carbonates, a carbonic acid halide, preferably phosgene, is additionally used as a bifunctional acid derivative.

Suitable chain terminators for the preparation of the aromatic polyesters and polyester carbonates are, in addition to the abovementioned monophenols, also the chlorocarbonates and the acyl chlorides of aromatic monocarboxylic acids, which may optionally be substituted by $C_1$-$C_{22}$-alkyl groups or by halogen atoms, and also aliphatic $C_2$-$C_{22}$-monocarbonyl chlorides.

The amount of chain terminators is in each case 0.1 to 10 mol-%, relative to the number of moles of diphenols in the case of phenolic chain terminators and relative to the number of moles of dicarbonyl dichlorides in the case of monocarbonyl chloride chain terminators.

The aromatic polyesters and polyester carbonates may also be copolymerized with aromatic hydroxycarboxylic acids.

The aromatic polyesters and aromatic polyester carbonates may either be linear or branched in a known manner. (In this respect, likewise see DE-OS No. 2,940,024 and DE-OS No. 3,007,934.)

Branching agents which can be used are, for example, trifunctional or polyfunctional carbonyl chlorides, such as trimesyl trichloride, cyanuric trichloride, 3,3',4,4'-benzophenone-tetracarbonyl tetrachloride, 1,4,5,8-naphthalene-tetracarbonyl tetrachloride or pyromellityl tetrachloride, in amounts from 0.1 to 1.0 mol-% (relative to the amount of dicarbonyl dichlorides employed) or trifunctional or polyfunctional phenols, such as phloroglucinol, 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methyl-benzyl)-4-methyl-phenol, 2-(4-hydroxyphenyl)-2-(2,4-dihydroxyphenyl)-propane, tetra-(4-[4-hydroxyphenylisopropyl]-phenoxy)-methane and 1,4-bis-[4,4''-dihydroxytriphenyl)-methyl]-benzene, in amounts from 0.01 to 1.0 mol-% (relative to the amount of diphenols employed). Phenolic branching agents can be initially introduced together with the diphenols, and acid chloride branching agents can be introduced together with the acyl dichlorides.

The proportion of carbonate structural units in the thermoplastic, aromatic polyester carbonates can be varied as desired.

The proportion of carbonate groups is preferably up to 100 mol-%, in particular up to 80 mol %, particularly preferably up to 50 mol %, relative to the sum of ester groups and carbonate groups.

Both the ester and the carbonate components in the aromatic polyester carbonates can exist in the form of blocks or randomly distributed in the polycondensate.

The relative solution viscosity ($\eta$rel) of the aromatic polyesters and aromatic polyester carbonates is in the range 1.18 to 1.4, preferably 1.22 to 1.3 (measured on solutions of 0.5 g of polyester carbonate in 100 ml of $CH_2C_{12}$ solution at 25° C.).

The thermoplastic, aromatic polycarbonates and/or polyester carbonates may be employed alone or mixed with one another as desired.

The graft polymer amount to be used according to the invention for petroleum-resistant finishing of the polycarbonate and/or polyester carbonate moulding compositions is between 4 and 50% by weight, preferably between 10 and 40% by weight, in each case relative to 100% by weight of graft polymer and polycarbonate and/or polyester carbonate. The proportion by weight of polycarbonate and/or polyester carbonate is thus between 96% by weight and 50% by weight, preferably between 90% by weight and 60% by weight.

The present invention thus also relates to mixtures containing (A) 96% by weight to 50% by weight, preferably 90% by weight to 60% by weight, relative to the total of the weights of (A)+(B), of thermoplastic, aromatic polycarbonates and/or polyester carbonates, and (B) 4% by weight to 50% by weight, preferably 10% by weight to 40% by weight, relative to the total of the weights of (A)+(B), of graft polymers, which mixtures are characterized in that the graft polymers (B) are prepared from (a) 40 to 90% by weight of an at least partially crosslinked, particulate diene rubber of average particle diameter 0.05 $\mu$m to 2.0 $\mu$m, preferably 0.1 $\mu$m to 0.6 $\mu$m, and (b) 60 to 10% by weight of styrene, acrylonitrile or methyl methacrylate, or mixtures thereof, by emulsion graft polymerization, an initiator system comprising an organic hydroperoxide and ascorbic acid being used for the graft polymerization and a graft yield of >60% by weight, preferably >75% by weight, in particular >85% by weight, relative to the monomers (b) employed, being achieved.

A maximum of half, preferably a maximum of a third, of the thermoplastic, aromatic polycarbonates and/or polyester carbonates in component (A) may be replaced by other thermoplastic resins (C). Other thermoplastic resins (C) are those which are other than components (A) and (B).

Thermoplastic resins (C) other than polycarbonates and/or polyester carbonates are, for example, vinyl copolymers C.1 or polyalkylene terephthalates C.2.

Vinyl copolymers as in component C.1 which can be employed according to the invention are those prepared from at least one monomer from the series comprising styrene, $\alpha$-methylstyrene and ring-substituted styrene (C.1.1) and at least one monomer from the series comprising acrylonitrile, methacrylonitrile, methyl methacrylate, maleic anhydride and N-substituted maleiimide (C.1.2).

Thermoplastic copolymers having a composition as in component C.1 may be produced as byproducts during the graft polymerization for the preparation of component B.; the copolymer C.1 amount which can be employed according to the invention does not include this byproduct of the graft polymerization.

The copolymers of component C.1 are resinous, thermoplastic and rubber-free. Particularly preferred copolymers C.1 are those prepared from styrene and/or $\alpha$-methylstyrene and acrylonitrile and if appropriate methyl methacrylate.

Particularly preferred weight ratios in the thermoplastic copolymer C.1 are 60 to 80% by weight of C.1.1 and 40 to 20% by weight of C.1.2.

Ring-substituted styrenes which may be mentioned are halostyrenes and p-methylstyrene.

The copolymers of component C.1 are known and can be prepared by free-radical polymerization, in particular by emulsion, suspension, solution or bulk polymerization. The copolymers of component C.1 preferably have molecular weights $M_w$ (weight average, determined by light scattering or sedimentation) between 15,000 and 200,000 and limiting viscosities between 20 and 110 ml/g (measured in dimethylformamide at 25° C.).

Polyalkylene terephthalates C.2 in the context of the invention are products of the reaction of aromatic dicarboxylic acids or reactive derivatives thereof (for example dimethyl esters or anhydrides) and aliphatic, cycloaliphatic or araliphatic diols, and mixtures of these reaction products. They can be prepared by known methods (Kunststoff-Handbuch, [Plastics Handbook], Vol. VIII, pp.695 ff, Carl-Hanser Verlag, Munich, 1973).

Preferred polyalkylene terephthalates C.2 contain at least 80, preferably at least 90, mol-%, relative to the dicarboxylic acid components, of terephthalic acid radicals and at least 80, preferably at least 90, mol-%, relative to the diol components, of ethylene glycol radicals and/or butane-1,4-diol radicals.

The preferred polyalkylene terephthalates C.2 may contain, in addition to terephthalic acid radicals, up to 20 mol-% of radicals of other aromatic or cycloaliphatic dicarboxylic acids having 8 to 14 C atoms or aliphatic dicarboxylic acids having 4 to 12 C atoms, such as, for example, radicals of phthalic acid, isophthalic acid, naphthalene-2,6-dicarboxylic acid, 4,4'-diphenyldicarboxylic acid, succinic acid, adipic acid, sebacic acid, azelaic acid and cyclohexanediacetic acid.

The preferred polyalkylene terephthalates C.2 may contain, in addition to ethylene glycol radicals and butane-1,4-diol radicals, up to 20 mol-%, preferably up to 10 mol-%, of other aliphatic diols having 3 to 12 C atoms or cycloaliphatic diols having 6 to 21 C atoms, for example radicals of propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol and -1,6-diol, 2-ethylhexane-1,3-diol, 2,2-diethylpropane-1,3-diol, hexane-2,5-diol, 1,4-di-(8-hydroxyethoxy)-benzene, 2,2-bis(4-hydroxycyclohexyl)-propane, 2,4-dihydroxy-1,1,3,3-tetramethylcyclobutane, 2,2-bis-(3-$\beta$-hydroxyethoxyphenyl)-propane and 2,2-bis-(4-hydroxypropoxyphenyl)-propane (DE-OS Nos. 2,407,647, 2,407,776 and 2,715,932).

The polyalkylene terephthalates C.2 may be branched by incorporation of relatively small amounts of trihydric or tetrahydric alcohols or tribasic or tetrabasic carboxylic acids, such as, for example, described in DE-OS No. 1,900,270 and U.S. Pat. No. 3,692,744. Examples of preferred branching agents are trimesic acid, trimellitic acid, trimethylolethane, trimethylolpropane and pentaerythritol.

Particularly preferred polyalkylene terephthalates C.2 are those which have been prepared only from terephthalic acid, or reactive derivatives thereof (for example dialkyl esters thereof), and ethylene glycol and/or butane-1,4-diol, and mixtures of these polyalkylene terephthalates.

The polyalkylene terephthalates preferably used as component C.2 generally have an intrinsic viscosity of 0.4 to 1.5 dl/g, preferably 0.5 to 1.3 dl/g, in particular 0.6 to 1.2 dl/g, in each case measured in phenol/o-dichlorobenzene (1:1 parts by weight) at 25° C.

The present invention thus also relates to mixtures containing (A) 96% by weight to 50% by weight, preferably 90% by weight to 60% by weight, of the polycarbonate and/or polyester carbonate in question, and (B) 4% by weight to 50% by weight, preferably 10% by weight to 40% by weight, of the graft polymer in question, a maximum of half of the percent by weight, preferably a maximum of a third of the percent by weight, of component (A) being replaced by other thermoplastics (C), preferably by thermoplastic vinyl copolymers C.1 or thermoplastic polyalkylene terephthalates C.2, and the sum of the percent by weight of components (A)+(B)+(C) in each case being 100% by weight.

The polycarbonate and/or polyester carbonate moulding compositions may contain further additives which are customary for thermoplastic, aromatic polyesters, thermoplastic, aromatic polycarbonates or for thermoplastic, aromatic polyester carbonates, vinyl copolymers or for polyalkylene terephthalates, such as stabilizers, pigments, flow agents, mould-release agents, flame retardants and antistatics.

Correspondingly customary additives for graft polymers may likewise be added.

The polycarbonate and/or polyester carbonate moulding compositions containing components (A), (B) and if appropriate (C) and/or effective amounts of customary stabilizers, pigments, flow agents, mould-release agents, flame retardants and/or antistatics are prepared by mixing the respective components in a known manner and compounding or extruding the melts thereof at temperatures from 200° C. to 330° C. in customary machines, such as internal kneaders, extruders or twin-screw extruders.

The present invention thus also relates to a process for the production of thermoplastic moulding compositions containing components (A), (B) and if appropriate (C) and/or effective amounts of customary stabilizers, pigments, flow agents, mould-release agents, flame retardants and/or antistatics, which process is characterized in that components (A), (B) and if appropriate (C), stabilizers, pigments, flow agents, mould-release agents, flame retardants and/or antistatics are mixed in a known manner and the melts are then compounded or extruded at temperatures from 200° C. to 330° C. in conventional machines.

The individual components can be mixed in a known manner either successively or simultaneously, and either at about 20° C. (room temperature) or at elevated temperature.

The moulding compositions of the present invention can be used for the production of mouldings of all types. In particular, mouldings can be produced by injection moulding. Examples of mouldings which can be produced are on the one hand housing parts of all types for example for domestic appliances, such as juice presses, coffee machines and mixers, and on the other hand cladding sheets for the building sector and parts for the building sector and in particular parts for the automotive sector. In addition, they are employed in electrical engineering, for example for socket strips, since they have very good electrical properties.

A further form of processing is the production of mouldings by thermoforming pre-fabricated sheets or films.

Particle size always denotes the average particle diameter $d_{50}$, determined by ultracentrifuge measurements by the method of W. Scholtan et al., Kolloid-Z. und Z. Polymere 250 (1972), 782–796.

EXAMPLES

1. Polycondensates and polymers employed (A) Linear polycarbonate based on bisphenol A having a relative solution viscosity $\eta$rel of 1.26 to 1.28, measured in $CH_2Cl_2$ at 25° C. and at a concentration of 0.5 g/100 ml.

(B) Graft polymers
 (a) Graft base
 Emulsion of a partially crosslinked, coarse polybutadiene of average particle diameter 0.38 µm ($d_{50}$ value) and gel content 89% by weight. The emulsion contains 50% by weight of polymer solids.
 (b) Preparation of the graft polymers (B.I) Graft polymer prepared from 50% by weight of diene rubber (a) and 50% by weight of SAN copolymer, in accordance with German Patent Application No. P 3,708,913.7 (Le A 25 099).

A mixture of 200 parts by weight of the latex (a) and 149 parts by weight of water are introduced into a reactor and heated to 60° C. to 62° C. The two solutions or emulsions below are introduced into the reactor in any sequence at this temperature:

1.
 0.0836 part by weight of cumene hydroperoxide
 6.9600 parts by weight of water
 0.0600 part by weight of the Na salt of $C_{14}$–$C_{16}$-alkyl-sulphonic acids 2.
 0.0557 part by weight of ascorbic acid
 6.9600 parts by weight of water The additives below are then metered into the reactor while stirring over the course of 4 hours at an internal temperature of 60° to 62° C.:

(Z1)
 39.05 parts by weight of water
 4.00 parts by weight of the Na salt of disproportionated abietic acid
 3.10 parts by weight of 1N sodium hydroxide solution
 0.62 part by weight of cumene hydroperoxide (Z2)
 72 parts by weight of styrene and
 28 parts by weight of acrylonitrile (Z3)
 39.8 parts by weight of water and
 0.105 part by weight of ascorbic acid The mixture is subsequently polymerized to completion for 6 hours at 60° to 62° C. The monomer conversion is greater than 97% by weight.

After stabilization using 1.2 parts by weight of phenolic antioxidants per 100 parts by weight of graft polymer, the graft polymer is isolated by coagulation using an acetic acid/Mg sulphate mixture, washed and dried to give a powder.

The SAN grafting proceeded in a graft yield of 89% by weight.

The graft yield was determined from fractional separation using the separating liquids dimethylformamide/methylcyclohexane in the ultracentrifuge and by determining the amounts and chemical composition of the fractions thus obtained [see R. Kuhn, Makromol-Chemie 177, 1525 (1976)].

(B.II) Graft polymer prepared from 50% by weight of diene rubber (a) and 50% by weight of SAN copolymer (Comparative example)

The following are introduced into a reactor:

1,500 parts by weight of emulsion a) and 1,030 parts by weight of water. After heating the mixture to 65° C., an initiator solution comprising 3 parts by weight of potassium peroxidisulphate in 50 parts by weight of water is fed in. The two solutions below are subsequently fed into the reactor within 6 hours at 65° C.:

1.
540 parts by weight of styrene and
210 parts by weight of acrylonitrile 2.
1,000 parts by weight of water
13 parts by weight of the Na salt of disproportionated abietic acid and
10 parts by weight of 1N sodium hydroxide solution The mixture is subsequently polymerized to completion by stirring for 4 hours at 65° C. The monomer conversion is greater than 98% by weight. The graft polymer is stabilized and isolated analogously to procedure (B.I). The SAN grafting proceeded in a graft yield of 55% by weight. The graft yield was determined as for (B.I).

(C)
C.I Styrene/acrylonitrile copolymer having a styrene:acrylonitrile ratio of 72:28 and a limiting viscosity of $[\eta]=0.55$ dl/g (measurement in dimethylformamide at 20° C.).

C.II Linear polyethylene terephthalate having an intrinsic viscosity $[\eta]=0.76$ dl/g, measured in phenol/o-dichlorobenzene (1:1 parts by weight) at 25° C. and at a concentration of 0.5 g/dl.

2. Preparation and testing of the moulding compositions

Components (A), (B) and if appropriate (C) were compounded in a 3 l internal kneader at temperatures from 200° to 220° C. (Examples 1 to 4) or in a twin-screw extruder at 260° C. (Example 5).

The mouldings were produced, unless otherwise stated, on an injection-moulding machine at 260° C.

The stress cracking behaviour was investigated in accordance with DIN 53 449/3 on the proportional rods 0.7. The simulated fuel used was a mixture of 50% by weight of toluene and 50% by weight of isooctane. The test specimens were pre-elongated using an arc template and stored in simulated fuel for 5 minutes at 23° C. The pre-elongations $C_x$ were 0.4 to 2%. The stress cracking behaviour was assessed via the crack formation or fracture as a function of the pre-elongation.

The Izod notched impact strength was determined on test specimens measuring 2.5×0.5×0.125 inches (in accordance with ASTM-D-256) or measuring 80×10×4 mm (ISO R 180) at room temperature, −20° C., −30° C., −40° C. and −50° C. The brittle/tough transition, i.e. the temperature range in which the first brittle fractures appear, was determined from the values measured.

As Table 1 below shows, polycarbonate moulded compositions according to the invention which are tough at low temperatures are obtained, the examples according to the invention showing improved resistance towards simulated fuels compared with comparable recipes, i.e. crack formation resulting in fracture of test specimen only occurs at relatively high outer fibre strains, or not at all.

TABLE 1

Composition and properties of the moulding compositions

| Ex. | A | B.I | B.II | C.I | C.II | Fracture at $C_R$ (%) | Brittle-tough transition (°C.) |
|---|---|---|---|---|---|---|---|
| 1 | 80 | 20 | | | | 0.6 | <−40 |
| 2[1] | 80 | | 20 | | | 0.4 | <−40 |
| 3 | 45 | 33 | | 22 | | no fracture[2] | <−40 |
| 4[1] | 45 | | 33 | 22 | | 0.7 | <−40 |
| 5 | 68 | 15 | | | 17 | no fracture[2] | −35 |

[1]Comparative examples
[2]No fracture until $C_R = 2.0\%$

We claim:
1. Mixtures containing
(A) 96% by weight to 50% by weight, relative to the total of the weights of (A) and (B), of thermoplastic, aromatic polycarbonates of polyester carbonates or both, and
(B) 4% by weight to 50% by weight, relative to the total of the weights of (A) and (B), of graft polymers, characterized in that the graft polymers (B) are prepared from
(a) 40 to 90% by weight of an at least partially crosslinked, particulate diene rubber having an average particle diameter of 0.05 μm to 2.0 μm, being a homopolymer of the monomers butadiene, isoprene or chloroprene, or copolymers of those monomers with up to 40% by weight of other monomers, and
(b) 60 to 10% by weight of styrene, acrylonitrile or methyl methacrylate, or mixtures thereof, by emulsion graft polymerization, an initiator system comprising an organic hydroperoxide and ascorbic acid being used for the graft polymerization and a graft yield of greater than 60% by weight, relative to the monomers (b) employed, being achieved.

2. Mixtures according to claim 1 wherein component (B)(a) is a homopolymer of butadiene, isoprene or chloroprene.

3. Mixtures according to claim 1 wherein component (B)(a) is butadiene homopolymer.

4. Mixtures according to claim 1 wherein component (B)(a) is a copolymer of butadiene, isoprene or chloroprene with other monomers which comprise acrylonitrile, styrene or mixtures thereof, with or without small quantities of a polyfunctional vinyl monomer.

5. Process for the preparation of the mixtures of claim 1, characterized in that components (A) and (B) and at least one of stabilizers, pigments, flow agents, mould-release agents, flame retardants or antistatics are mixed and the melts are thereby compounded or extruded at temperatures of 200° C. to 330° C. in conventional machines.

6. Mixtures according to claim 1, characterized in that a maximum of half of the percent by weight of component (A) is replaced by other thermoplastics (C), the sum of the percent by weight of components (A)+(B)+(C) in each case being 100% by weight.

7. Mixtures according to claim 1, characterized in that a mixture of a third of the present by weight of component (A) is replaced by other thermoplastics (C).

8. Mixtures according to claim 7, characterized in that the other thermoplastics (C) used are a thermoplastic vinyl copolymer C.1 or a thermoplastic polyalkylene terephthalate C.2.

9. Mixtures according to claim 8, characterized in that component C.1 is a styrene-acrylonitrile copolymer.

10. Mixtures according to claim 8 characterized in that component C.2 is polyethylene terephthalate or polybutylene terephthalate.

11. Mixtures according to claim 1, characterized in that they contain, in addition, effective amounts of at least one of stabilizers, pigments, flow agents, mould-release agents, flame retardants or antistatics.

* * * * *

UNITED STATES PATENT AND TRADEMARK OFFICE
CERTIFICATE OF CORRECTION

PATENT NO. : 4,937,285

DATED : June 26, 1990

INVENTOR(S) : Dieter Wittmann, Jochen Schoeps, Christian Lindner and Hans-Jurgen Kress It is certified that error appears in the above-identified patent and that said Letters Patent is hereby corrected as shown below:

Column 15, line 11, "mixture" should correctly read --maximum-- and "present" should correctly read --percent--.

Signed and Sealed this

Twenty-eighth Day of July, 1992

Attest:

DOUGLAS B. COMER

Attesting Officer

Acting Commissioner of Patents and Trademarks